(12) United States Patent
Mohammed et al.

(10) Patent No.: US 11,709,989 B1
(45) Date of Patent: Jul. 25, 2023

(54) METHOD AND SYSTEM FOR GENERATING CONVERSATION SUMMARY

(71) Applicant: Ada Support Inc., Toronto (CA)

(72) Inventors: Salman Mohammed, Toronto (CA); Gordon Gibson, Toronto (CA)

(73) Assignee: Ada Support Inc., Toronto (CA)

(*) Notice: Subject to any disclaimer, the term of this patent is extended or adjusted under 35 U.S.C. 154(b) by 18 days.

(21) Appl. No.: 17/710,454

(22) Filed: Mar. 31, 2022

(51) Int. Cl.
G06F 40/10 (2020.01)
G06F 16/34 (2019.01)
G06N 3/084 (2023.01)
G06F 16/38 (2019.01)
G06F 16/31 (2019.01)

(52) U.S. Cl.
CPC ............ *G06F 40/10* (2020.01); *G06F 16/313* (2019.01); *G06F 16/345* (2019.01); *G06F 16/38* (2019.01); *G06N 3/084* (2013.01)

(58) Field of Classification Search
CPC .......... G06N 3/084; G06N 3/08; G06F 40/10; G06F 16/313; G06F 6/31; G06F 16/345; G06F 16/34; G06F 16/38
See application file for complete search history.

(56) References Cited

U.S. PATENT DOCUMENTS

| | | | |
|---|---|---|---|
| 9,881,614 B1 | 1/2018 | Thirukovalluru et al. | |
| 10,679,011 B2 | 6/2020 | Galitsky | |
| 10,757,044 B2 | 8/2020 | Fawcett | |
| 10,832,002 B2 | 11/2020 | Kozhaya et al. | |
| 10,884,598 B2 | 1/2021 | Bhatt et al. | |
| 11,004,013 B2 | 5/2021 | Elisenzopf | |
| 11,095,579 B1 | 8/2021 | de Mazancourt et al. | |
| 11,151,982 B2 | 10/2021 | Tomkins et al. | |
| 2019/0087391 A1 | 3/2019 | Cranshaw et al. | |
| 2019/0188590 A1 | 6/2019 | Wu et al. | |
| 2020/0142719 A1 | 5/2020 | Akbulut et al. | |
| 2020/0151583 A1 | 5/2020 | Mueller et al. | |
| 2020/0218859 A1 | 7/2020 | Galitsky | |
| 2021/0064826 A1 | 3/2021 | Rajagopal et al. | |
| 2021/0328888 A1 | 10/2021 | Rath | |

(Continued)

FOREIGN PATENT DOCUMENTS

| | | | | |
|---|---|---|---|---|
| CN | 110263324 A | * | 9/2019 | ........... G06F 40/295 |
| WO | WO-2022043713 A1 | * | 3/2022 | ............. G10L 13/04 |

OTHER PUBLICATIONS

Liu et al. "Text Summarization with Pretrained Encoders", Computation and Language, 2019, pp. 11.*

(Continued)

*Primary Examiner* — Li Wu Chang

(57) ABSTRACT

Methods and systems for generating and using a conversation summary model. The method comprises receiving at least one training dataset. The at least one training dataset comprises data samples, each data sample comprising a text comprising text segments. The text is labelled with a conversation summary comprising any of the text segments which summarize the text. The at least one training dataset includes a dataset from a specific source. Using the at least one training dataset and the pre-trained model, the method further comprises generating the conversation summary model by fine-tuning the pre-trained model. The generated conversation summary model may be used to generate conversation summaries for chat conversations.

20 Claims, 8 Drawing Sheets

(56) References Cited

U.S. PATENT DOCUMENTS

| | | | |
|---|---|---|---|
| 2021/0350073 A1 | 11/2021 | Trehan | |
| 2021/0375289 A1* | 12/2021 | Zhu | G10L 15/26 |
| 2022/0108714 A1* | 4/2022 | Novikova | G10L 25/66 |

OTHER PUBLICATIONS

Tang et al. "CONFIT: Toward Faithful Dialogue Summarization with Linguistically-Informed Contrastive Fine-tuning", Computation and Language, Dec. 2021, pp. 11.*

Fu et al. "Document Summarization with VHTM: Variational Hierarchical Topic-Aware Mechanism", AAAI, 2020, pp. 7740-7747.*

Wang et al. "A Text Abstraction Summary Model Based on BERT Word Embedding and Reinforcement Learning", Applied Sciences 9, No. 21: 4701, https://doi.org/10.3390/app9214701, Nov. 4, 2019.

Chen et al., "DialogSum Challenge: Summarizing Real-Life Scenario Dialogues", In Proceedings of the 14th International Conference on Natural Language Generation, pp. 308-313, Aberdeen, Scotland, UK. Association for Computational Linguistics, Dec. 31, 2021.

Kim et al., "Bot in the Bunch: Facilitating Group Chat Discussion by Improving Efficiency and Participation with a Chatbot", Proceedings of the 2020 CHI Conference on Human Factors in Computing Systems. Association for Computing Machinery, New York, NY, USA, 1-13. DOI:https://doi.org/10.1145/3313831.3376785, Apr. 30, 2020.

Tamrakar et al., "Design and Development of Chatbot: A Review", Conference: International Conference on "Latest Trends in Civil, Mechanical and Electrical Engineering" At: Maulana Azad National Institute of Technology, Bhopal, Apr. 30, 2021.

Chisty, J. et al, An Artificial Chatbot, Bachelor of Science in Computer Science and Engineering, Daffodil International University, http://dspace.daffodilvarsity.edu.bd:8080/bitstream/handle/123456789/2688/P11755%20%2816%25%29.pdf? Dec. 31, 2018.

Abigail, Peter J. Liu, and Christopher D. Manning, "Get to the point: Summarization with pointer-generator networks", arXiv preprint arXiv:1704.04368 (2017).

Hermann, Karl Moritz, et al., "Teaching machines to read and comprehend, Advances in neural information processing systems" 28 (2015).

Koupaee, Mahnaz, and William Yang Wang, "Wikihow: A large scale text summarization dataset", arXiv preprint arXiv:1810.09305 (2018).

Cohan, Arman, et al., "A discourse-aware attention model for abstractive summarization of long documents", arXiv preprint arXiv:1804.05685 (2018).

Devlin, Jacob, et al., "Bert: Pre-training of deep bidirectional transformers for language understanding", arXiv preprint arXiv:1810.04805 (2018).

Google Research, https://github.com/google-research/bert, Mar. 11, 2020.

Sanh, Victor, et al., "DistilBERT, a distilled version of BERT: smaller, faster, cheaper and lighter"., arXiv preprint arXiv:1910.01108 (2019).

Liu, Yinhan, et al., Roberta: "A robustly optimized BERT pretraining approach", arXiv preprint arXiv:1907.11692 (2019).

Sun, Zhiqing, et al., "Mobilebert: a compact task-agnostic BERT for resource-limited devices", arXiv preprint arXiv:2004.02984 (2020).

Vaswani, Ashish, et al., "Attention is all you need", Advances in neural information processing systems 30, (2017).

* cited by examiner

METHOD AND SYSTEM FOR GENERATING CONVERSATION SUMMARY

TECHNICAL FIELD

Example embodiments relate to natural language processing in the context of conversations, chats, the like.

BACKGROUND

Device-based chatting (also referred to as chatting) includes communication between two or more parties to share information and discuss various subjects. While chats may be short, e.g., few lines, others may be lengthy with hundreds, if not thousands, of lines between various parties. These chats may need to be reviewed, which can be time-consuming. Automatically generating a chat summary may save a significant amount of time.

Chats have become integral technology at several companies where humans (e.g. users/customers) chat with customer service. Customers may chat with a live agent or chatbots instead of calling and speaking to the live agent. These chats may, at times, be reviewed for several reasons. To name a few, the live agent resumed the chat with a customer after some time, a second agent took over the chat, or a manager needed to review the chat for quality assurance and other purposes. In all these scenarios, summarizing the conversation would be of great use. A chat summary may be written manually by noting down the conversation summary.

Sometimes, chatbots (short for chatterbots) are used instead of live agents. Chatbots are automated chatting platforms between users and computing devices. Chatbots are conversational computer programs or applications designed to mimic written human speech. Chatbots may be considered one of the most promising interaction technologies between humans and computing devices. Chatbots play a considerable role in revolutionizing how enterprises communicate with their users (customers). It is crucial to interact with users as quickly and clearly as possible in today's busy business environment. There are occasions when the user requires a transfer from a chatbot to a live agent. Traditionally, the live agent needs to review the conversation before conversing with the user. A person may summarize a chat by manually analyzing text, extracting key points, and locating keywords. This problem may be resolved by automatically generating a conversation summary.

Therefore, there is a need for systems and methods that automatically generate conversation summaries for chats.

SUMMARY

A summary of a chat, in general, concludes and finds highlights of the chat. The summary may include the best ideas or the most relevant sentences in the text of the chat conversation.

Example embodiments relate to the training of a model capable of generating a conversation summary from a chat. In an example embodiment, a method and system for generating a conversation summary model is an optimized machine learning model configured to generate a conversation summary. Systems of such an embodiment are more efficient than manually reviewing chat conversations. Traditionally, computing devices are used for chatting, but such computing devices were incapable of automatically generating a summary for the chat. Instead, a human may need to interfere and summarize the chat conversation. The conversation summary model enables the computing devices to generate conversation summaries automatically without human intervention. Hence, such computing devices are substantially faster and save significantly more time than those needing human interference.

The system and method uses a pre-trained model, which is a transformer-based model configured through training to understand the meaning of a text and the relationship between words. The system and method fine-tunes the pre-trained model at least once using a specific dataset, which is a dataset acquired from a specific source. The majority of the data samples of the specific dataset can be from chat conversations. The data samples of the specific dataset can also be from text from other generic sources (e.g. news articles, publications, etc.). Fine-tuning the pre-trained model generates a conversation summary model capable of generating a conversation summary for a chat conversation. The conversation summary has text segments and scores. The system and method further refines the conversation summary and includes only the text segments having scores satisfying a criterion.

An example embodiment is a method for generating a conversation summary model. The method includes receiving at least one training dataset. The at least one training dataset comprises data samples. Each data sample has a text comprising text segments, the text being labelled with a conversation summary comprising any of the text segments which summarize the text. The at least one training dataset includes a dataset from a specific source. The method further comprises generating, using a pre-trained model, the conversation summary model by fine-tuning the pre-trained model using the at least one training dataset.

In an example embodiment, the any of the text segments comprises zero text segments. In another example embodiment, the any of the text segments comprises one or more text segments.

In an example embodiment, the pre-trained model is a transformer-based model. In an example embodiment, the transformer-based model is a RoBERTa model.

In an example embodiment, the at least one training dataset further comprises another dataset from a generic source.

In another example embodiment, the generating the conversation summary model by fine-tuning comprises generating a preliminary model by fine-tuning the pre-trained model using the dataset from the generic source. Further, the method comprises generating the conversation summary model by fine-tuning the preliminary model using the dataset from the specific source.

In an example embodiment, the dataset from the generic source includes a majority of the data samples not from chat conversations. In another example embodiment, the dataset from the specific source includes a majority of the data samples from chat conversations. In an example embodiment, the dataset from the specific source includes data samples from chat conversations and data samples not from chat conversations.

In an example embodiment, the dataset from a specific source is a monologue. In an example embodiment, the at least one training dataset is an extractive dataset.

In an example embodiment, the fine-tuning comprising adjusting values of learnable parameters of the pre-trained model by training a classifier to predict the any of the text segments of the conversation summary of at least one data sample of the data samples of the at least one training dataset. The fine-tuning comprises generating, using the pre-trained model and the classifier, the predicted any of the text segments. The method further comprises computing a loss based on the predicted any of the text segments and the respective any of the text segments. The respective any of the text segments being ground truth obtained from the at least one training dataset. The method further comprises back-propagating the loss through the classifier and the pre-trained model to adjust values of learnable parameters of the pre-trained model and values of learnable parameters of the classifier.

In an example embodiment, the classifier is one of a neural network, a linear classifier, and a combination of a transformer and the linear classifier. In an example embodiment, an output of the pre-trained model is an input to the classifier.

In an example embodiment, the generated conversation summary model is used to generate the conversation summary of a chat conversation, including text segments (also called chat conversation text segments). In another example embodiment, the generated conversation summary of the chat conversation comprises scores for the text segments.

An example embodiment is a method for generating a conversation summary. The method comprises receiving a chat conversation, the chat conversation including text segments. Further, the method includes generating, using the chat conversation and a conversation summary model, a score for each text segment. Also, the method further comprises generating the conversation summary for the chat conversation, including any of the text segments having the respective score which satisfies a criterion.

In an example embodiment, the criterion has a threshold value used in refining the scores of the text segments. In another example embodiment, the criterion is a greater-than operator, and satisfying the criterion indicates the scores of the text segments are greater than the threshold value. In another example embodiment, the criterion is a specified number of text segments having a highest score value. In an example embodiment, the criterion is a specified number of text characters, words, lines, or paragraphs having a highest score value.

In an example embodiment, the chat conversation further comprises a party that wrote a respective text segment of the text segments. In an example embodiment, the conversation summary further comprises the party that wrote the respective text segment. In an example embodiment, the party of at least one respective text segment is a chatbot. In an example embodiment, the party of at least one respective text segment is a human.

In an example embodiment, the conversation summary model is generated by receiving at least one training dataset, the at least one training dataset comprising data samples. Each data sample comprises a text comprising text segments (also called data sample text segments). The text is labelled with a conversation summary comprising any of the text segments which summarize the text. The at least one training dataset includes a dataset from a specific source. Further, the method comprises generating, using a pre-trained model, the conversation summary model by fine-tuning the pre-trained model using the at least one training dataset.

In an example embodiment, the any of the text segments comprises zero text segments. In another example embodiment, the any of the text segments comprises one or more text segments. In another example embodiment, the pre-trained model is a transformer-based model. In an example embodiment, the transformer-based model is a RoBERTa model. In an example embodiment, the at least one training dataset includes comprises another dataset from a generic source.

In an example embodiment, the generating the conversation summary model by fine-tuning comprises generating a preliminary model by fine-tuning the pre-trained model using the dataset from the generic source. Further the method comprises generating the conversation summary model by fine-tuning the preliminary model using the dataset from the specific source.

In an example embodiment, the dataset from the generic source includes a majority of the data samples not from chat conversations. In another example embodiment, the dataset from the specific source includes a majority of the data samples from chat conversations. In another example embodiment, the dataset from the specific source includes data samples from chat conversations and data samples not from chat conversations.

In an example embodiment, the fine-tuning comprises adjusting values of learnable parameters of the pre-trained model by training a classifier to predict the any of the text segments of the conversation summary of at least one data sample of the data samples of the at least one training dataset. The fine-tuning comprises generating, using the pre-trained model and the classifier, the predicted any of the text segments. Further, the fine-tuning comprises computing a loss based on the predicted any of the text segments and the respective any of the text segments. The respective any of the text segments may be ground truth obtained from the at least one training dataset. Further, the fine-tuning comprises back-propagating the loss through the classifier and the pre-trained model to adjust values of learnable parameters of the pre-trained model and values of learnable parameters of the classifier.

Example embodiments are a computer program product generated by instructions stored in a non-transitory computer-readable medium which, when executed by at least one processor, causes the at least one processor to generate a conversation summary model. The conversation summary generator comprises receiving at least one training dataset. Further, the at least one training dataset comprises data samples. Each data sample comprises a text comprising text segments. The text is labelled with a conversation summary comprising any of the text segments which summarize the text. The at least one training dataset includes a dataset from a specific source. Further, the non-transitory computer-readable medium has instructions, when executed by the at least on processer, causes the at least one processor to generate, using a pre-trained model, the conversation summary model by fine-tuning the pre-trained model using the at least one training dataset.

Example embodiments are for a computer program product generated by instructions stored in a non-transitory computer-readable medium which, when executed by at least one processor, causes the at least one processor to generate a conversation summary. The conversation summary is generated by receiving a chat conversation. The chat conversation include text segments. Further, the non-transitory computer-readable medium has instructions, when executed by the at least on processer, causes the at least one processor to generate, using the chat conversation and a conversation summary model, a score for each text segment. Further, the generated conversation summary for the chat conversation includes any of the text segments having the respective score which satisfies a criterion.

BRIEF DESCRIPTION OF THE DRAWINGS

Reference will now be made, by way of example, to the accompanying drawings which show example embodiments, and in which.

DETAILED DESCRIPTION

Figure 1:
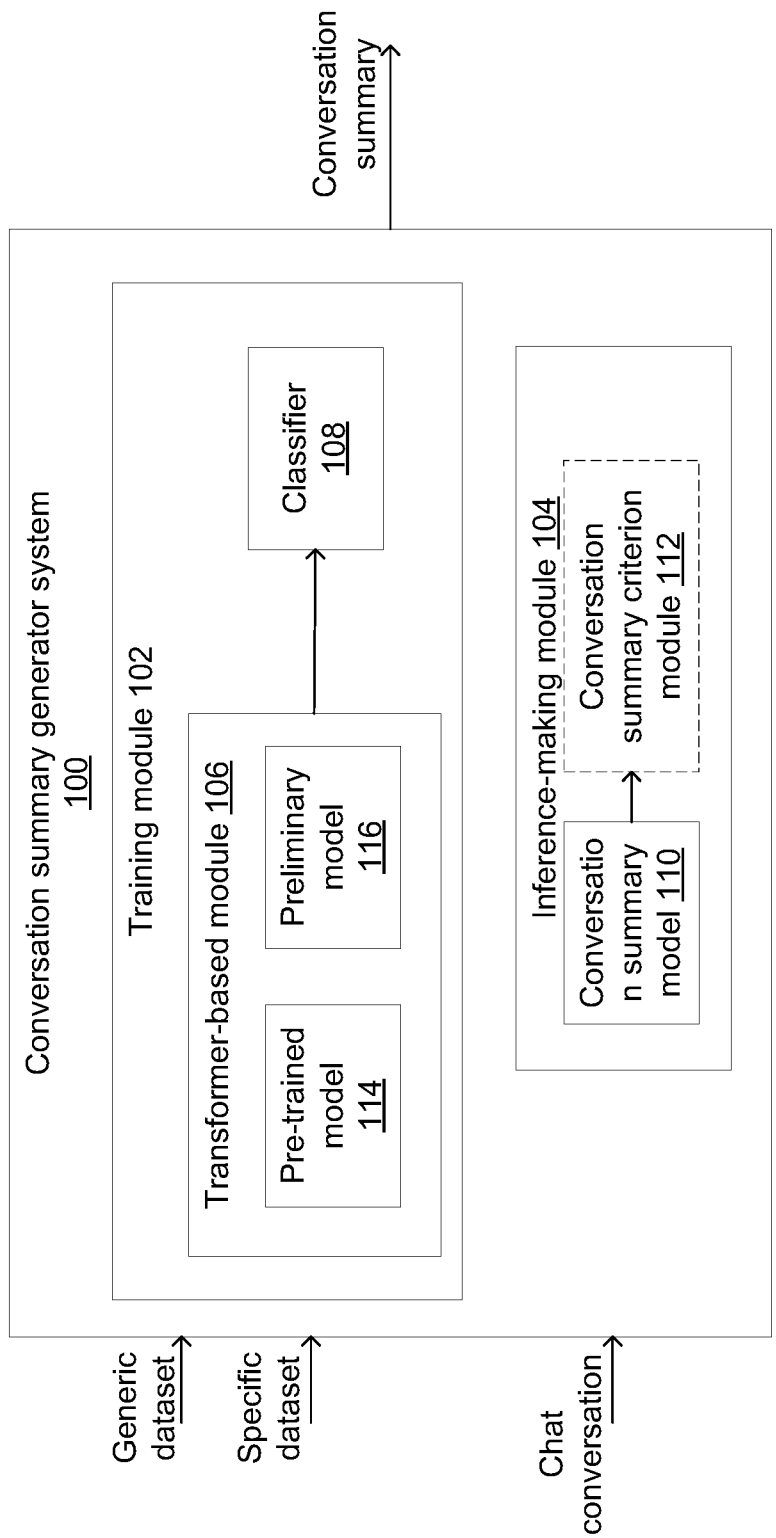
FIG. 1 illustrates a data flow diagram of an example conversation summary generator system, according to example embodiments.

Example embodiments include a method for generating a conversation summary for a chat conversation. The conversation summary generator operates in two modes: training and inference-making. In the training mode, the method can include receiving two training datasets to fine-tune a pre-trained model. The fine-tuned model can generate a conversation summary. In example embodiments, each training dataset has data samples that are annotated. Each data sample has a text and may have text segments summarizing the text; these text segments are annotations (also referred to as labels or ground truth). In some examples, there are data samples labelled with zero text segments summarizing the text, which means that the annotation is "null". In an example, these two training datasets are from different sources: the specific dataset can contain texts from chat conversations manually annotated by humans. The generic dataset can have news articles or scientific publications manually annotated by humans. The generic dataset does not have the majority of the data samples from chat conversations. In other words, the generic dataset has data samples not explicitly related to texts from chat conversations. Example embodiments may have the specific dataset as a hybrid dataset pooling data samples from chat conversations and not from chat conversations, wherein the data samples from the chat conversations are not a majority. In other words, such example embodiments can receive one dataset instead of two or more.

In example embodiments, the conversation summary generator method includes fine-tuning a pre-trained model to generate the conversation summary model capable of predicting the text segments summarizing the text of the training datasets, if such text segments exist, or predicting a "null" summary if no text segments exit. Each pre-trained model has learnable parameters adjusted and optimized during fine-tuning. The fine-tuning is performed by adjusting learnable parameters of the pre-trained model while training a classier at the output of the pre-trained model. The pre-trained model and the classifier are trained to generate the conversation summary.

In example embodiments, the conversation summary generator method includes using both datasets in the fine-tuning stage. The generic dataset is used to generate a preliminary model in the first stage. Then the preliminary model is further fine-tuned using the specific dataset to generate the conversation summary model.

The aforementioned example embodiments are for the training stage. In example embodiments, the conversation summary model is used to generate a conversation summary for a chat conversation, in other words, the inference-making step. In such example embodiments, the fine-tuned model receives a chat conversation and outputs the conversation summary. The conversation summary may include text segments summarizing the conversation summary, and each text segment has a score corresponding to the confidence that such message summary is, in fact, a summary. In example embodiments, the conversation summary model is also configured to generate conversation summaries having text segments meeting a particular criterion. For instance, only the text segments (interchangeably referred to as message summary) having scores above a pre-specified confidence threshold are stored and considered part of the conversation summary.

In example embodiments, the pre-trained language model is a pre-trained bidirectional encoder representations from transformers model. The pre-trained language model comprises a plurality of embedding layers comprising learnable parameters with values.

FIG. 1 illustrates a data flow diagram of a conversation summary generator system 100. The conversation summary generator system 100 includes two modules, a training module 102 and an inference-making module 104. Dashed lines represent optional components. The training module is responsible for fine-tuning a pre-trained model 114 stored in the transformer-based module 106 with the assistance of a classifier 108. The transformer-based module 106 processes the data samples through the pre-trained model 114 and the optional preliminary model 116. The result of fine-tuning the pre-trained model 114, depending on the number of fine-tune iterations, is the conversation summary model 110 that can be used in the inference-making module 104 to generate a preliminary conversation summary having scores for text segments of the chat conversation, which is an input to the inference-making module 104.

In the example embodiment of FIG. 1, the inference-making module 104 also optionally includes a conversation summary criterion module 112 responsible for refining the preliminary conversation summary generated from a chat conversation in the conversation summary model 110. Therefore, example embodiments can have the conversation summary criterion module 112, which is shown as an optional component in the conversation summary generator system 100. For example embodiments having the conversation summary criterion module 112, the output of the conversation summary model 110 is a preliminary conversation summary finalized through refining by the conversation summary criterion module 112 to generate the conversation summary. Following is a detailed explanation of the processes performed by the training module 102 and the inference-making module 104.

Training performed by the training module 102 is a process in machine learning and artificial intelligence that generates a model with learnable parameters optimized on a training dataset(s) to perform a task (e.g. generating conversation summary for chat conversations). Inference-making, however, is performed in the inference-making module 104. Inference-making is a process in machine learning and artificial intelligence that uses the model generated in training to perform the task (e.g. using the generated conversation summary model at run-time to generate conversation summary).

In the example embodiment of FIG. 1, the conversation summary generator system 100 receives two datasets for the training module 102: one is a generic dataset, and the other is a specific dataset. Both datasets have data samples, and each data sample is a text which may be annotated with one or more text segments summarizing the text. Some data samples may not have a text segment summarizing the text of the data sample. In example embodiments, these datasets are extractive. An extractive dataset is a dataset in which the annotated summary for each data sample (e.g. the one or more text segments summarizing the data sample or "null" if no text segments summarize the data sample) are sentences or keywords extracted verbatim from the text.

The generic datasets are training datasets that may not strictly have data samples from a chat conversation. The data samples may include a monologue that is written or otherwise expressed (e.g., spoken and transcribed) by a single party. The data samples may also be from multiple parties working together to generate a narrative rather than responding to each other. For instance, the generic dataset may include stories, news articles, plays, etc. Some example embodiments are news articles or scientific publications.

Example embodiments may use the CNN/DM ("Abigail, Peter J. Liu, and Christopher D. Manning, Get to the point: Summarization with pointer-generator networks, arXiv preprint arXiv:1704.04368 (2017)", incorporated herein by reference in its entirety, and "Hermann, Karl Moritz, et al., Teaching machines to read and comprehend, Advances in neural information processing systems 28 (2015)", incorporated herein by reference in its entirety). The CNN/DM is a database containing over 300K unique articles written by CNN and the Daily Mail journalists. For both datasets, the publisher highlighted sentences. These highlight sentences are considered the conversation summary, which has text segments.

Another generic dataset can be the WikiHow ("Koupaee, Mahnaz, and William Yang Wang, Wikihow: A large scale text summarization dataset, arXiv preprint arXiv:1810.09305 (2018)", incorporated herein by reference). WikiHow contains 200 k data samples with instruction-step paragraphs annotated with summarizing sentences. Therefore the summarizing sentences can be the conversation summary of the data sample. Another generic dataset may be PubMed/ArXiv ("Cohan, Arman, et al., A discourse-aware attention model for abstractive summarization of long documents, arXiv preprint arXiv:1804.05685 (2018)", incorporated herein by reference in its entirety), which has two datasets related to scientific publications. PubMed/ArXiv dataset has 133 k articles from PubMed and 215K articles from arXiv. For the PubMed/ArXiv dataset, the abstract was considered the conversation summary. It is to be understood that the aforementioned datasets from generic sources, which provide the generic datasets, are just examples and not meant to be a limitation. Other datasets may be equally applicable. Further, one or more of the previous datasets may be combined and considered as the generic dataset.

The specific dataset is different from the generic dataset. The specific dataset can have chat conversation. The chat conversation may be between a human (also called user) and a chatbot, a user and a live agent, multiple users, and/or a combination of thereof. Therefore, the specific dataset is conversational in nature where a party responds to other parties. This dataset is collected from chats from different sources. For example, the sources can be chats from different domains or industries (e.g. finance, logistics, education, transportation, etc.). Example embodiments have the specific dataset as chat conversations from a particular client, company, entity, etc. Example embodiments may have the specific dataset as a hybrid between chat conversations and data samples from generic datasets.

Chat conversations of different industries may have different contexts. For instance, chats from a finance industry may revolve around exchange rate, retirement, tax, etc., while chats from a logistics industry may include freight fee, delivery, etc. Example embodiments may have the specific dataset being from one industry, or it may be from a combination of one or more industries.

FIG. 1 shows the training dataset as input into the training module 102. The training module 102 receives the training datasets, which are two datasets in this example embodiment (e.g., a generic dataset and a specific dataset), and fine-tunes a pre-trained model 114 in the transformer-based module 106. The pre-trained model 114 uses machine learning and artificial intelligence. The pre-trained model 114 in the transformer-based module 106 is usually trained on unlabeled textual data to learn language representation. Therefore, the pre-trained model 114 is not trained for a specific task but can be used for a particular task (e.g. generating conversation summary) through fine-tuning and the assistance of a subsequent classifier 108. The fine-tuning may be supervised learning.

The pre-trained model 114 may be a transformer-based model such as BERT, which is a bidirectional encoder representations from transformers proposed by "Devlin, Jacob, et al., Bert: Pre-training of deep bidirectional transformers for language understanding, arXiv preprint arXiv:1810.04805 (2018)", incorporated by reference herein in its entirety, or other transformer-based models built on BERT.

The pre-trained model 114 in the transformer-based module 106 is a machine-learning based embedding generation technique. The pre-trained model 114 comprises a plurality of embedding layers, each embedding layer generating an embedding. Each embedding layer performs computations on the embedding of the previous embedding layer. Therefore, the pre-trained model 114 receives a word or a collection of words and generates embeddings for each word and the collection of words. Each data sample of the datasets (e.g. the genetic dataset and the specific dataset) may contain sentences, which are a plurality of words. The words of a sentence typically have a relationship to each other based on their relative positions in a sequence of words (e.g., in a sentence). A sentence may also include non-words, such as symbols (e.g., "?", "!", "@", "#", and other punctuation marks), whitespace or numeric characters.

The transformer-based module 106 can include a tokenizer (not shown) that tokenizes each sentence, wherein tokenization is a technique that separates the sentence into units referred to as tokens. For example, the sentence may be the text string "Hello, check order!". This sentence may be tokenized into the tokens "Hello", "check", "order", and "!".Each token is represented with a unique identifier (ID). The transformer-based module 106 may further process the tokenized sentence into a dense vector representation of each token, referred to as a token embedding. Therefore, an embedding is a numerical matrix representation of a sentence. Each embedding comprises a plurality of token embeddings. Each token embedding is a numerical vector representation of a token. Further, some example embodiments may have the embedding having a separate token called a classification token representing the sentence as a whole.

Token embeddings of semantically related tokens are closer to each other in a vector space (where the vector space is defined by all embeddings generated from sentences). For example, a first token embedding representing the token "Hello" and a second token embedding representing the token "Hi" can be closer to each other in the vector space when compared to the distance between the token "Hello" and another token embedding representing the token "Dog."

The dimensionality of a token embedding depends on the pre-trained model 114 used to generate the embedding; in particular, the length of the token embedding relies on the number of hidden units per embedding layer of the pre-trained model 114. The dimensionality of all token embeddings may be the same. An example embodiment can use BERT-Large Uncased (24 embedding layers, 1024 hidden units), BERT-Large Cased (24 embedding layers, 1024 hidden units), BERT-Base Uncased (12 embedding layers, 768 hidden units), BERT-Large Uncased (24 embedding layers, 1024 hidden units), BERT-Base Cased (12 embedding layers, 768 hidden units), and BERT-Large Cased (24 embedding layers, 1024 hidden units), all these pre-trained language models are generated by Google™, and available at (Google Research, http://github.com/google-research/bert, Mar. 11, 2020), all of which are incorporated by reference herein in their entirety. It is understood that the disclosed pre-trained models 114 can be used in some examples. Other pre-trained models 114 can be used in other examples.

A person skilled in the art will understand that other transformer-based pre-trained model can be used. Example embodiments may use DistillBert, taught in "Sanh, Victor, et al., DistilBERT, a distilled version of BERT: smaller, faster, cheaper and lighter., arXiv preprint arXiv:1910.01108 (2019)", incorporated herein by reference in its entirety. DistillBert improves inference-making speed over BERT. DistillBERT is a distilled version of BERT. It uses only half the number of parameters of BERT yet retains 97% of BERT's performance. It uses a method called distillation, which approximates a larger neural network by a smaller network.

Example embodiments may use XLNet, which introduces permutation language modelling where tokens are predicted in random order. In BERT, tokens are predicted in sequential order. Example embodiments may use RoBERTa, taught in "Liu, Yinhan, et al., Roberta: A robustly optimized BERT pretraining approach, arXiv preprint arXiv:1907.11692 (2019)", incorporated herein in its entirety by reference. Unlike BERT, RoBERTa does not have next sentence prediction and introduces dynamic masking so that the masked token changes. Also, more data was used when training the RoBERTa than in BERT.

Example embodiments may use MobileBert, discussed in "Sun, Zhiqing, et al., Mobilebert: a compact task-agnostic BERT for resource-limited devices, arXiv preprint arXiv: 2004.02984 (2020)", incorporated by reference herein in its entirety. MobileBERT also has less number of parameters than BERT. Further transformer-based models (e.g. pre-trained model 114) may likely be available in the future, and a person skilled in the art will understand that such models may be equally applicable.

The pre-trained model 114 comprises a plurality of learnable parameters optimized through training on general, perhaps public, training datasets. However, the model can be fine-tuned to better understand a particular task, for example, generating a conversation summary. The process of fine-tuning adjusts the values of the learnable parameters of the pre-trained language model. In example embodiments, the pre-trained language model is fine-tuned twice with the assistance of the classifier 108, once using the generic dataset to generate a preliminary model and once using the specific dataset to generate the conversation summary model.

The classifier 108 is used when fine-tuning the models in the transformer-based module 106. The input to the classifier 108 is the output of the transformer-based module 106. In particular, it is the output of the pre-trained model 114 in the first fine-tuning iteration and the output of the preliminary model 116 in the second fine-tuning iteration.

In the first fine-tuning iteration, the generic dataset is used in fine-tuning the pre-trained model 114 and generating the preliminary model 116. In the second fine-tuning iteration, the specific dataset is used as input to the preliminary model, and the output of the preliminary model 116 is fed into the classifier 108 for further fine-tuning. Fine-tuning the preliminary model 116 generates the conversation summary model 110. In example embodiments, the generic dataset and the specific dataset are pooled together and collectively used to fine-tune the pre-trained model 114 to generate conversation summary model 110 in one fine-tuning iteration.

While fine-tuning a transformer-based model in the transformer-based module 106, which could be the pre-trained model 114 or the preliminary model 116, the transformer-based model along with the classifier 108, collectively, are tasked to predict the one or more text segments (if they exists) of the conversation summary of the data samples of the input datasets. Similarly, the transformer-based model, along with the classifier 108, collectively, may not predict a text segment if there are no text segments summarizing the data samples. The prediction may simply be "null". Therefore, the transformer-based model can refer to the pre-trained model 114 or the preliminary model 116, depending on the fine-tuning iteration. In the first fine-tuning iteration, the transformer-based model is the pre-trained model 114. In the second fine-tuning iteration, the transformer-based model can refer to the preliminary model 116, which is the pre-trained model 114 that is fine-tuned. The generic dataset is used in the first-tuning iteration, while the specific dataset is used in the second fine-tuning iteration.

When forward propagating data samples through the transformer-based model to predict conversation summary of the data samples, the training module 102 computes a fine-tuning loss. The fine-tuning loss is a loss function calculated through forward propagation of the data samples through the transformer-based model, which could be the pre-trained model 114 or the preliminary model 116. The fine-tuning loss is calculated by comparing the predicted text segments of data samples with respective text segments of the data samples, which are considered as ground truth obtained from the dataset. The predicted text segments are the output of the transformer-based model for an input data sample. The fine-tuning loss is back propagated through the transformer-based model to adjust values of learnable parameters of the transformer-based model and the classifier 108 and reduce the fine-tuning loss. This process is done iteratively. With each iteration, the fine-tuning loss decreases until the values of the learnable parameters of the transformer-based model are optimized on the processed dataset, which could be the generic dataset for the first fine-tuning or the specific dataset for the second fine-tuning. After completing the second fine-tuning iteration, the conversation summary model 110 is generated, which can be used in the inference-making module 104 to generate a preliminary conversation summary for a chat conversation. The preliminary conversation summary comprises text segments of the chat conversation, each has a score representing the confidence of such text segment being a part of the summary of the chat conversation.

The inference-making module 104 receives a chat conversation, then feeds the chat conversation into the conversation summary model 110 to generate a preliminary conversation summary, which has text segments and scores representing the confidence that each text segment is a text segment of a summary of the chat conversation. The output of the conversation summary model 110 can be referred to as preliminary conversation summary as further refining may be performed by the conversation summary criterion module 112. The conversation summary criterion module 112 receives the text segments of the preliminary conversation summary with respective scores and applies a criterion to decide which text segments (if any) to output.

Example embodiments have a criterion as the greater-than operator. For the greater-than operator, the conversation summary criterion module 112 outputs text segments with scores greater than a pre-specified threshold. Example embodiments have the criterion as the number of top scores. For such a criterion, the conversation summary criterion module 112 outputs a pre-specified number of text segments only. Example embodiments have the criterion as a number of top scores. A pre-specified number of text segments with the top scores are outputted for such a criterion. For example, an example criterion is a specified number of text segments having a highest score value. Another example criterion is a specified number of text characters, words, lines, or paragraphs having a highest score value. For example, the conversation summary may be limited to 280 text characters to conform to applications such as Twitter™, or a specified number of text characters that can fit on a display screen or display window of a device for the reader.

The conversation summary criterion module 112 of example embodiments may have a combination of criteria. For example, the conversation summary criterion module 112 may have a pre-specified number of top scores criterion and the greater-than operator criterion. For such example embodiments, the output would be only the number of top scores greater than a threshold.

In some examples, the conversation summary criterion module 112 may not output any text segments as part of the conversation summary (e.g. an empty conversation summary or no conversation summary). For example, if no text segment has a score greater than the threshold for the greater-than operation criterion. It is to be understood that the above criteria are just examples, and several criteria may be used to refine and filter out undesired text segments.

The example embodiment of FIG. 1 illustrates two iterations of fine-tuning, one using a generic dataset and a second time using a specific dataset. However, this was just an example; the conversation summary generator system 100 performs adequately as long as at least one specific dataset is used to fine-tune a pre-trained model 114.

Example embodiments can have just the specific dataset. This specific dataset is used to fine-tune the pre-trained model 114 to generate the conversation summary model 110. In such an example embodiment, the preliminary model 116 is not generated. Therefore, some example embodiments may not use a generic dataset to fine-tune a pre-trained model 114 by the generic dataset alone.

Some example embodiments may use more than one generic dataset. Some example embodiments may pool multiple generic datasets into one generic dataset to fine-tune the pre-trained model 114 in one iteration. In contrast, others may use each generic dataset for a fine-tuning iteration, generating a new preliminary model 116 for each fine-tuning iteration.

Some example embodiments may pool multiple specific datasets from different industries into one specific dataset used to fine-tune the pre-trained model 114 in one iteration. Other example embodiments may use each specific dataset for a fine-tuning iteration (e.g. without pooling the datasets). Other example embodiments may pool generic datasets with specific datasets to fine-tune the pre-trained model 114. In some example embodiments, the sequence in which dataset to use may change and may achieve better results. For example, an example embodiment may alternate between generic and specific datasets.

FIG. 1 shows both the training module 102 and the inference-making module 104 in one conversation summary generator system 100. However, it is understood that the training module 102 and the inference-making module 104 may be in different systems. For example, one system performs the training, and another performs the inference-making.

Figure 2:
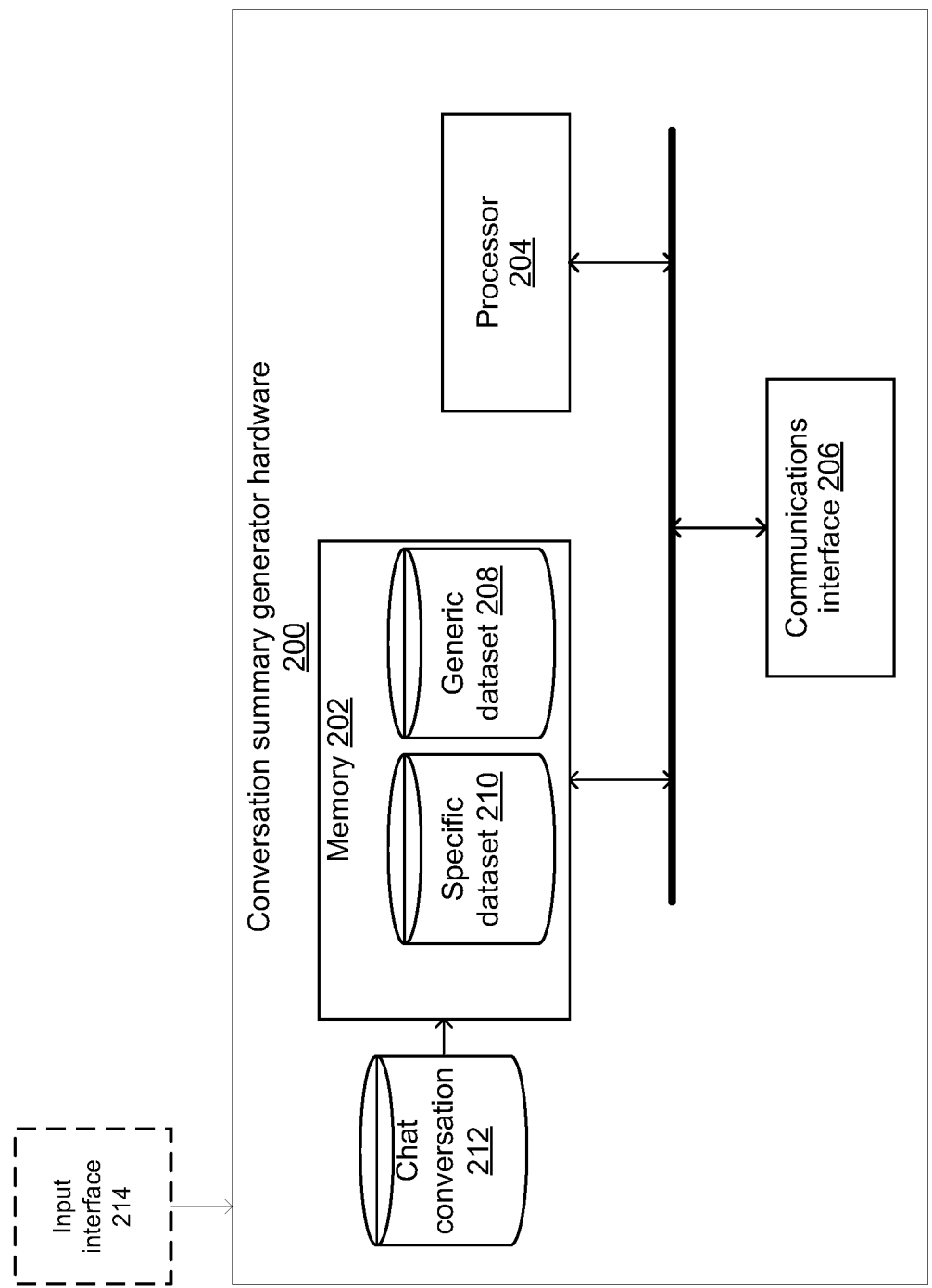
FIG. 2 is a schematic diagram of hardware implementing the conversation summary generator system, according to example embodiments.

FIG. 2 is a schematic diagram of hardware implementing the conversation summary generator system 100, according to example embodiments. The conversation summary generator hardware 200 includes a memory 202, a processor 204, and a communications interface 206. A communication connection is implemented between the memory 202, the processor 204, and the communications interface 206, for example, using a bus. The processor 204 is configured to perform, when the computer program stored in the memory 202 is executed by the processor 204, steps of the methods of the conversation summary generator system 100 detailed in FIG. 1 and steps of the methods described in FIGS. 3, 4, 5, 6, and 7 below.

The memory 202 can be a read-only memory (Read-Only Memory, ROM), a static storage device, a dynamic storage device, or a random access memory (Random Access Memory, RAM). The memory 202 may store a computer program. The memory 202 can be a non-transitory memory. The memory 202 can be external or removable in some examples. The memory 202 may store datasets for fine-tuning the pre-trained model 114 and the preliminary model 116 (if it exists), such as the generic dataset 208 and the specific dataset 210. In an example, the memory 202 includes more than one generic dataset and the specific dataset. In an example, the memory 202 includes the chat conversation 212. In other examples, one or more of the generic dataset, specific dataset, and the chat conversation are external to conversation summary generator hardware 200.

The processor 204 can be a general central processing unit (Central Processing Unit, CPU), a microprocessor, an application-specific integrated circuit (Application Specific Integrated Circuit, ASIC), a graphics processing unit (graphics processing unit, GPU), or one or more integrated circuits. The processor 204 may be an integrated circuit chip with a signal processing capability. In an implementation process, steps of the conversation summary generator method implemented by the conversation summary generator system 100 can be performed by an integrated logical circuit in a form of hardware or by an instruction in a form of a computer program in the processor 204. In addition, the processor 204 can be a general-purpose processor, a digital signal processor (Digital Signal Processor, DSP), an ASIC, a field-programmable gate array (Field Programmable Gate Array, FPGA) or another programmable logic device, a discrete gate or a transistor logic device, or a discrete hardware assembly. The processor 204 can implement or execute the methods, steps, and logical block diagrams described in example embodiments. The general-purpose processor can be a microprocessor, or the processor may be any conventional processor or the like. The steps of the conversation summary generator method of the conversation summary generator system 100 during training or inference making may be directly performed by a hardware decoding processor or may be performed by using a combination of hardware in the decoding processor and a computer program module. The computer program module may be located in a mature storage medium in the art, such as a random access memory, a flash memory, a read-only memory, a programmable read-only memory, an electrically erasable programmable memory, or a register. The storage medium is located in the memory 202. The processor 204 reads information from the memory 202, and completes, by using hardware in the processor 204, the steps of the conversation summary generator method during training or inference making.

During inference-making, the conversation summary generator hardware may receive chat conversation 212, for which the conversation summary is generated. The chat conversation 212 may be received via an input interface 214, which is an optional module that enables interfacing with one or more optional input devices (not shown). Optional input device(s) may include or more of a keyboard, a mouse, a microphone, a touchscreen, and a keypad. The chat conversation 212 may be received directly from keyboard input (e.g. a user chatting with another party). The chat conversation 212 may be received from another storage storing the chat between users. In other examples, one or more of the input device(s) may be included as a component of the conversation summary generator hardware 200.

The communications interface 206 implements communication between the conversation summary generator hardware 200 and another device or communications network using a transceiver apparatus, including but not limited to a transceiver. For example, the training dataset (e.g. the generic dataset and the specific dataset) may be obtained using the communications interface 206.

It should be noted that, although the memory 202, the processor 204, and the communications interface 206 are shown in the conversation summary generator hardware 200 in FIG. 2, in a specific implementation process, a person skilled in the art should understand that the conversation summary generator hardware 200 may further include other components that are necessary for implementing normal running. In addition, based on specific needs, a person skilled in the art should understand that the conversation summary generator hardware 200 may further include hardware components that implement other additional functions. In addition, a person skilled in the art should understand that conversation summary generator hardware 200 may include only a component required for implementing the embodiments, without a need to include all the components shown in FIG. 2.

Figure 3:
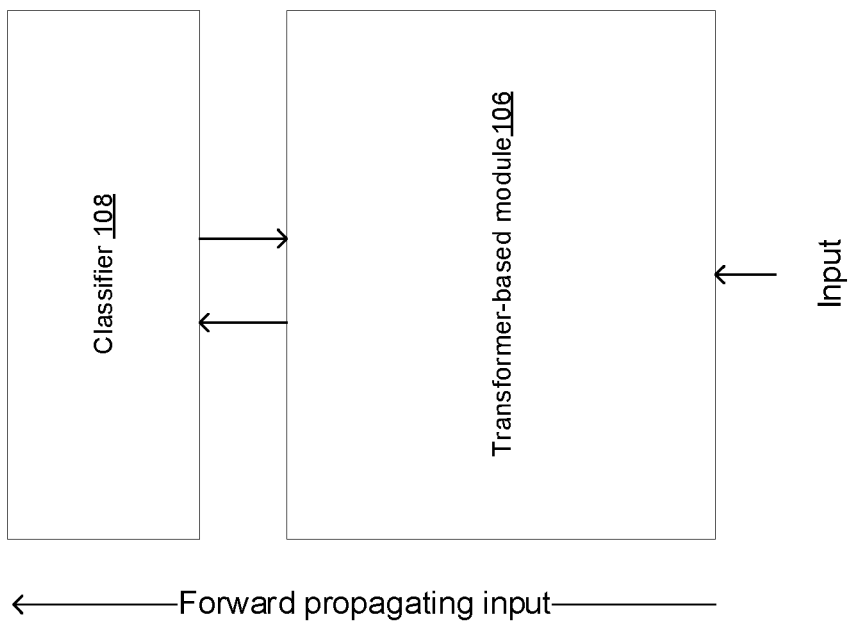
FIG. 3 is a data flow diagram illustrating a fine-tuning method performed in the training module of FIG. 2, according to example embodiments.

FIG. 3 is a data flow diagram illustrating the fine-tuning method in the training module 102. The fine-tuning method 300 includes the transformer-based module 106 and the classifier 108. The classifier 108 is trained, alongside the transformer-based model, to generate a fine-tuned model to predict the text segments of the conversation summary and scores for the text segments for the training datasets (generic dataset and specific dataset). The training module 102 receives data samples of the training dataset as input and train the classifier 108 and the transformer-based model, to predict the message summary of the dataset samples. The input is forward propagated from the first layer of the transformer-based model to the last layer of the transformer-based model, then through the classifier 108.

Several types of classifier 108 may be used. Example embodiments may use a neural network. For such a classifier 108, a neural network loss for the neural network is computed based on the classifier's 108 predicted message summaries of a data sample. The neural network loss is back propagated, adjusting values of learnable parameters of the respective neural network layers and the learnable parameters of the transformer-based model.

When values of learnable parameters of the classifier 108 and the transformer-based model are optimized, a fine-tuned model is generated, which completes an iteration of fine-tuning. In the example embodiment of FIG. 1, where two datasets are used, a generic dataset and a specific dataset, two fine-tuning iterations are performed. A first iteration generates a preliminary model 116, a fine-tuned model that optimizes performance for the generic dataset. Then, a second fine-tuning iteration is further performed on the preliminary model 116 for optimizing performance on the specific dataset. The fine-tuned model of the second fine-tuning iteration is the conversation summary model 110.

Several types of classifiers 108 may be used. The above-described classifier 108 was a neural network. However, other classifiers may be used. Example embodiments can have the classifier 108 as a linear classifier with two linear layers and an activation function. Example embodiments can have the classifier 108 as a linear classifier but with a single layer and an activation function. Example embodiments can have the classifier 108 as a transformer described in "Vaswani, Ashish, et al., Attention is all you need, Advances in neural information processing systems 30 (2017)", incorporated herein by reference in its entirety, followed by a linear transformation. Example embodiments can have the classifier 108 as the transformer followed by a linear classifier and an activation function. It is apparent to a person skilled in the art that a multitude of classifiers 108 may be used to fine-tune the pre-trained model 114 and the preliminary model 116 (if it exists).

Figure 4:
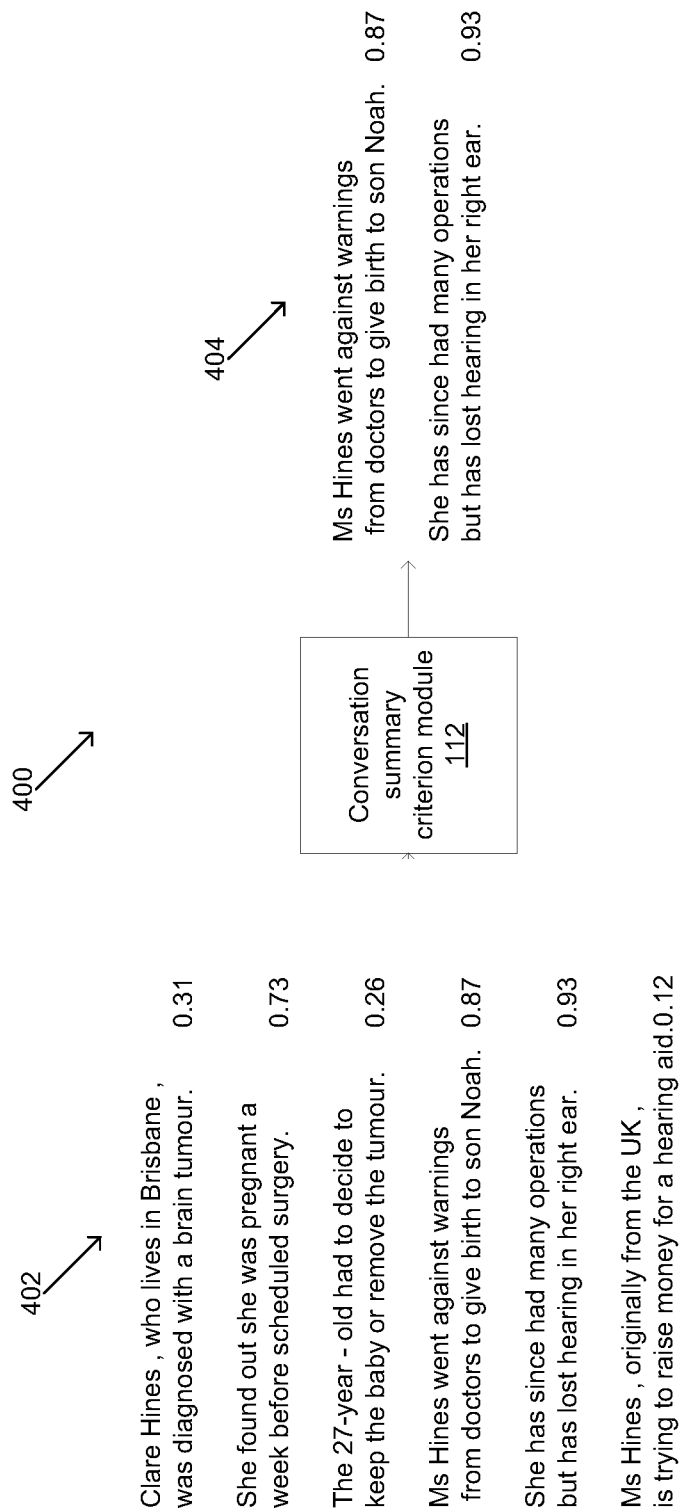
FIG. 4 is a flowchart of an example process performed by a conversation summary criterion module of FIG. 2, according to example embodiments.

FIG. 4 is a block diagram illustrating the process 400 performed in the conversation summary criterion module 112 for an example criterion. FIG. 4 shows examples from the CNN/DM dataset with hypothetical scores to illustrate the process performed in the conversation summary criterion module 112. The criterion in the conversation summary criterion module 112 of this example embodiment consists of two criteria: greater-than operator and a number of top scores. In this example embodiment, the threshold for the greater-than operator is 60%, and the number of top scores is 2.

The process 400 performed by the conversation summary criterion module 112 includes receiving preliminary conversation summary 402 having several text segments, each with a respective score. The preliminary conversation summary 402 is the output of the conversation summary model 110. The conversation summary criterion module 112 uses the top scores criterion and the greater-than operation criterion to decide which text segment to output and considers as the conversation summary 404, which are the text segments meeting the criterion (or criteria in this example embodiment). From the received preliminary conversation summary 402, three text segments have scores above 60%, and the number of top scores is 2. Hence, the conversation summary criterion module 112 outputs the conversation summary 404 having the text segments with scores 97% and 83%.

Figure 5:
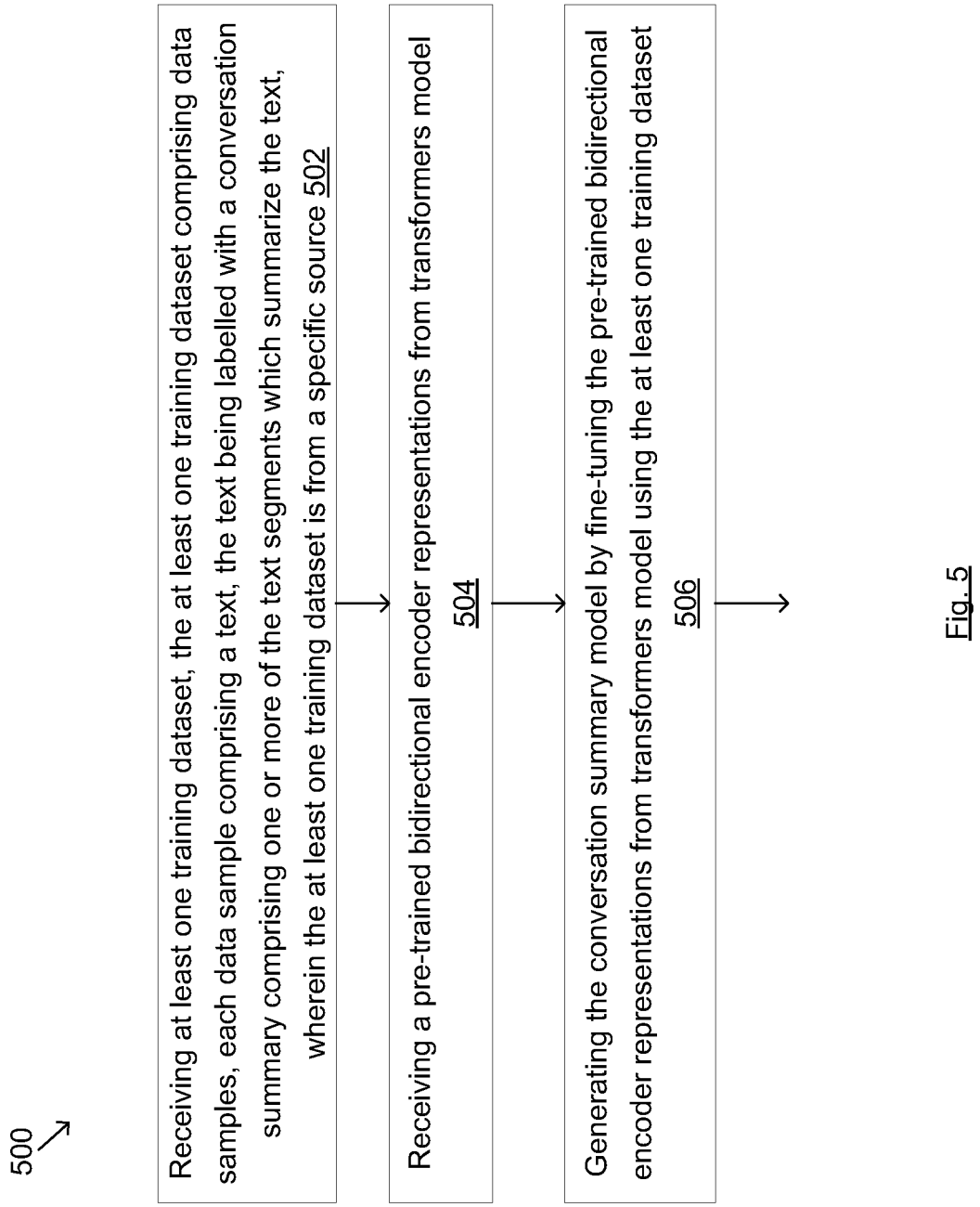
FIG. 5 is a flowchart for a first method for generating a conversation summary model, according to example embodiments.

FIG. 5 is a flowchart of a first conversation summary generator method 500 implemented in the conversation summary generator system 100 according to example embodiments. The first conversation summary generator method 500 fine-tunes a pre-trained model 114 with one dataset, a specific dataset. The first conversation summary generator method 500 starts at step 502. At step 502, the training module 102 receives at least one training dataset. In this example embodiment, the one training dataset is one dataset from a specific source. Hence, for the first conversation summary generator method 500, the training module 102 receives a specific dataset. The training dataset (e.g. the specific dataset in this example embodiment) comprises a text comprising text segments. In an example, for at least one training dataset, the text may be labelled with a conversation summary comprising one or more of the text segments which summarize the text. In another example, at least one training dataset is labelled with zero text segments (e.g. "null"), indicating that the text does not have text segments summarizing the text. In other words, none of the text in that dataset is relevant or worth summarizing.

In example embodiments, the specific dataset may include hybrid data samples, including data samples from a specific source and data samples from a generic source pooled together.

At step 504, the training module 102 receives a pre-trained bidirectional encoder representations from transformers model (e.g. a pre-trained model 114). Example embodiments use the RoBERTa model, but other transformer-based models may also be equally applicable.

At step 506, the training module 102 generates the conversation summary model by fine-tuning the pre-trained bidirectional encoder representations from transformers model (the pre-trained model 114) using the specific dataset. This example embodiment is for one fine-tuning iteration. In the fine-tuning iteration, the training module 102 adjusts learnable parameters of the pre-trained model 114 and the classifier 108 for the task of generating conversation summaries.

The generator conversation summary model can be used to generate a conversation summary of a chat conversation.

Figure 6:
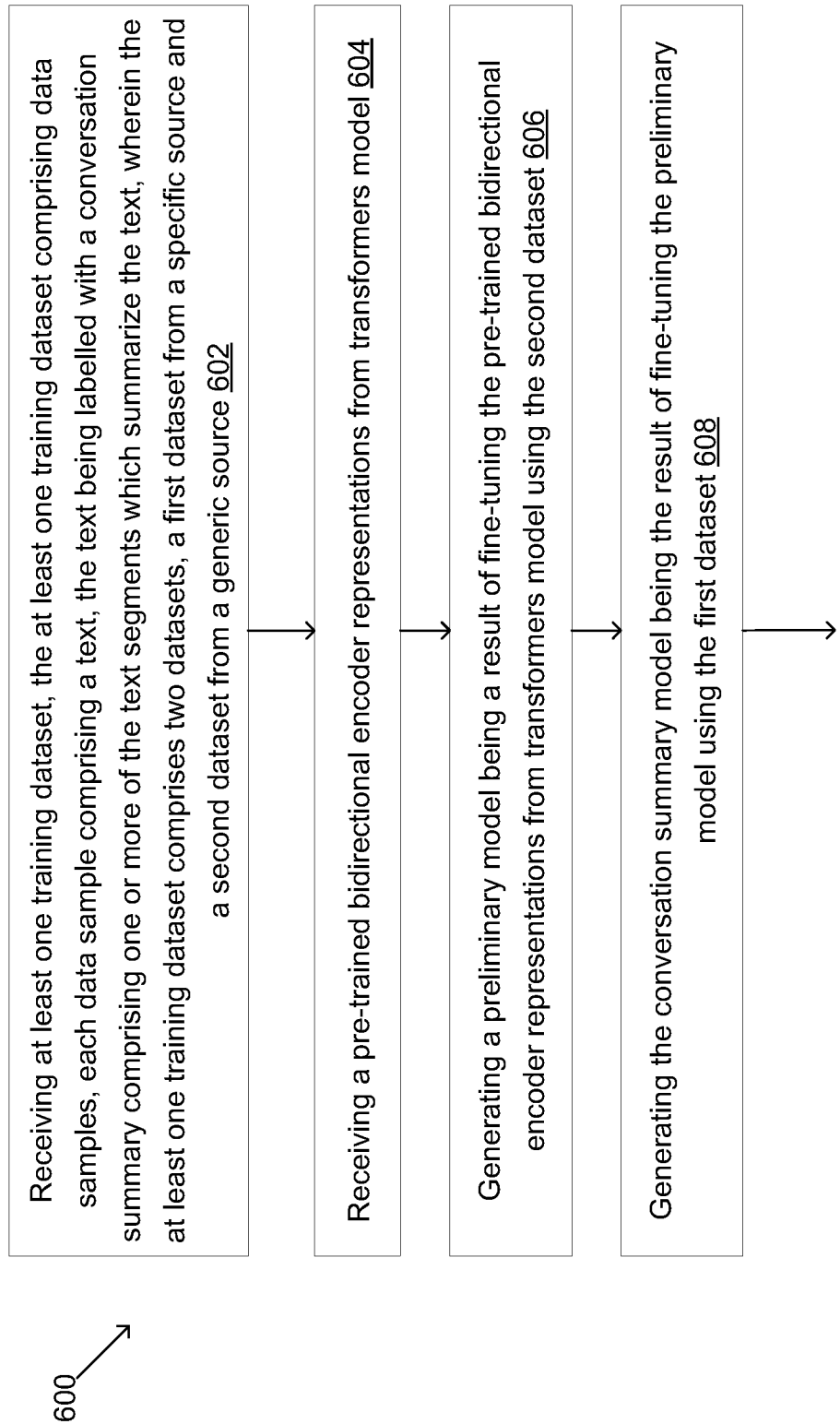
FIG. 6 is a flowchart for a second method for generating a conversation summary model, according to example embodiments.

FIG. 6 is a flowchart of a second conversation summary generator method 600 implemented in the conversation summary generator system 100 according to example embodiments. The second conversation summary generator method 600 fine-tunes a pre-trained model 114 and preliminary model 116, each with a training dataset. A generic dataset is used to fine-tune the pre-trained model 114 and the specific dataset to fine-tune the preliminary model 116. The second conversation summary generator method 600 starts at step 602.

At step 602, the training module 102 receives two training datasets, one from a specific source (e.g. a specific dataset) and another dataset from a generic source (e.g. a generic dataset).

At step 604, the training module 102 obtains a pre-trained bidirectional encoder representations from transformers model (e.g. the pre-trained model 114), which could be RoBERTa. Example embodiments may use other transformer-based models.

At step 606, the training module 102 starts a two-iteration fine-tuning of the pre-trained model 114, a first iteration uses the generic dataset and a second iteration uses the specific dataset. At step 606, the training module 102 generates a preliminary model as a result of fine-tuning the pre-trained model 114 using the generic dataset.

At step 608, the training module 102 performs the second fine-tuning iterations of the pre-trained model 114. At step 608, the training module 102 generates the conversation summary model 110 as the result of fine-tuning the preliminary model 116 using the specific dataset. The generator conversation summary model can be used to generate a conversation summary of a chat conversation.

Figure 7:
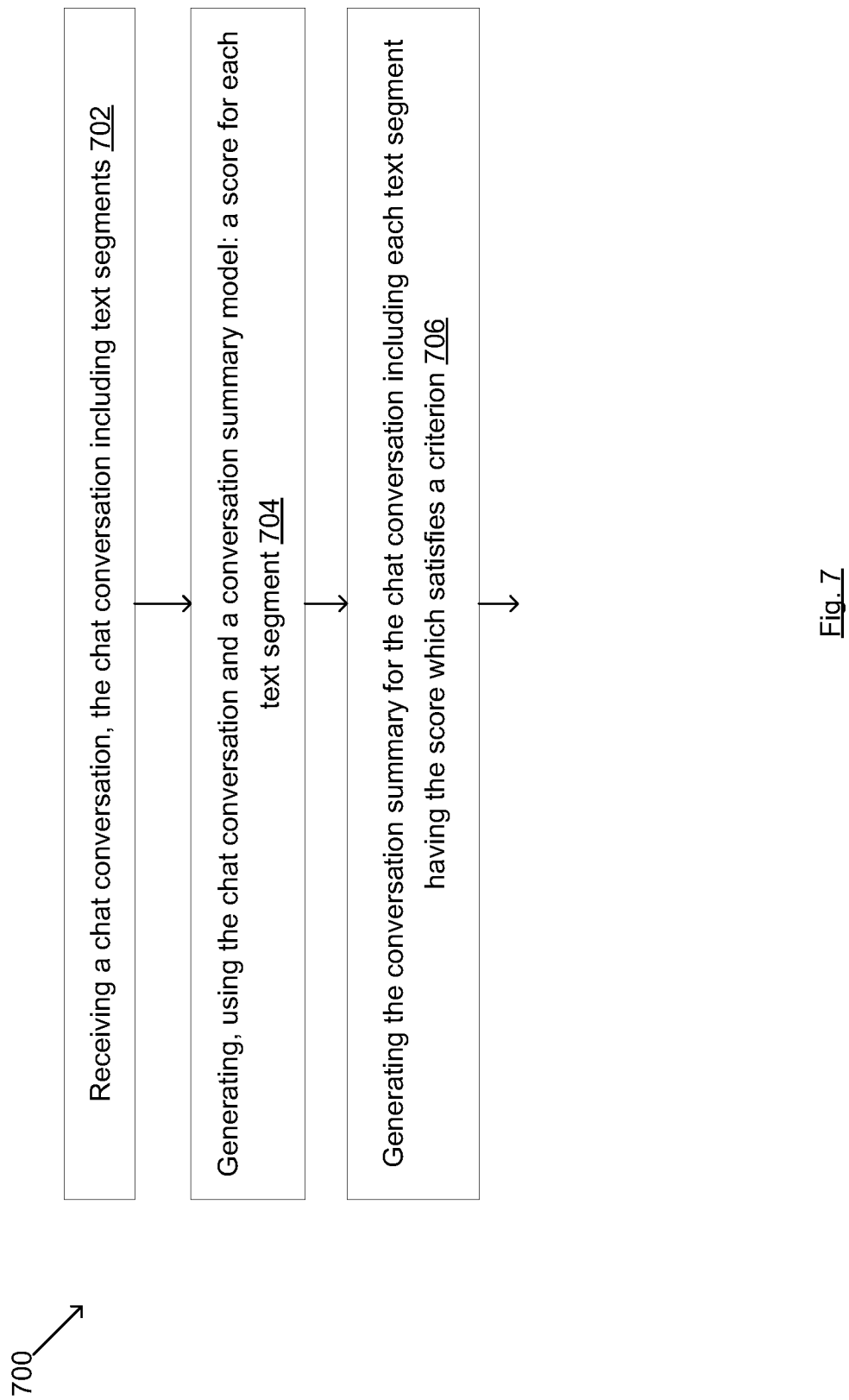
FIG. 7 is a flowchart for inference-making to generate a conversation summary, according to example embodiments.

FIG. 7 is a flowchart of a third conversation summary generator method 700 during inference-making implemented in the conversation summary generator system 100 according to example embodiments. The third conversation summary generator method 700 is performed in the inference-making module 104. At step 702, the inference-making module 104 receives a chat conversation as input. The chat conversation is a text from a chat that includes text segments. The chat conversation may also include information about the party(s) provided the text. The party may be one or more users, live agents, and/or chatbots. Therefore, the chat can be between a user and a live agent, a speech conversation transcribed into chat, and any source that can generate a chat as text between multiple parties.

At step 704, the inference-making module 104 receives a conversation summary model configured through training to generate conversation summaries. The conversation summary model can, for example, be the conversation summary models generated in FIG. 5 or FIG. 6. The inference-making module 104 generates, using the conversation summary model 110, a preliminary conversation summary having text segments with scores. Each text segment can be part of the conversation summary and has a respective score. The third conversation summary generator method 700 then proceeds to step 706.

At step 706, the inference-making module 104 generates the conversation summary for the chat conversation. The inference-making module 104 further processes the preliminary conversation summary in the conversation summary criterion module 112 to generate the conversation summary having only the text segments satisfying a criterion. Several of such criteria have been discussed above.

Figure 8:
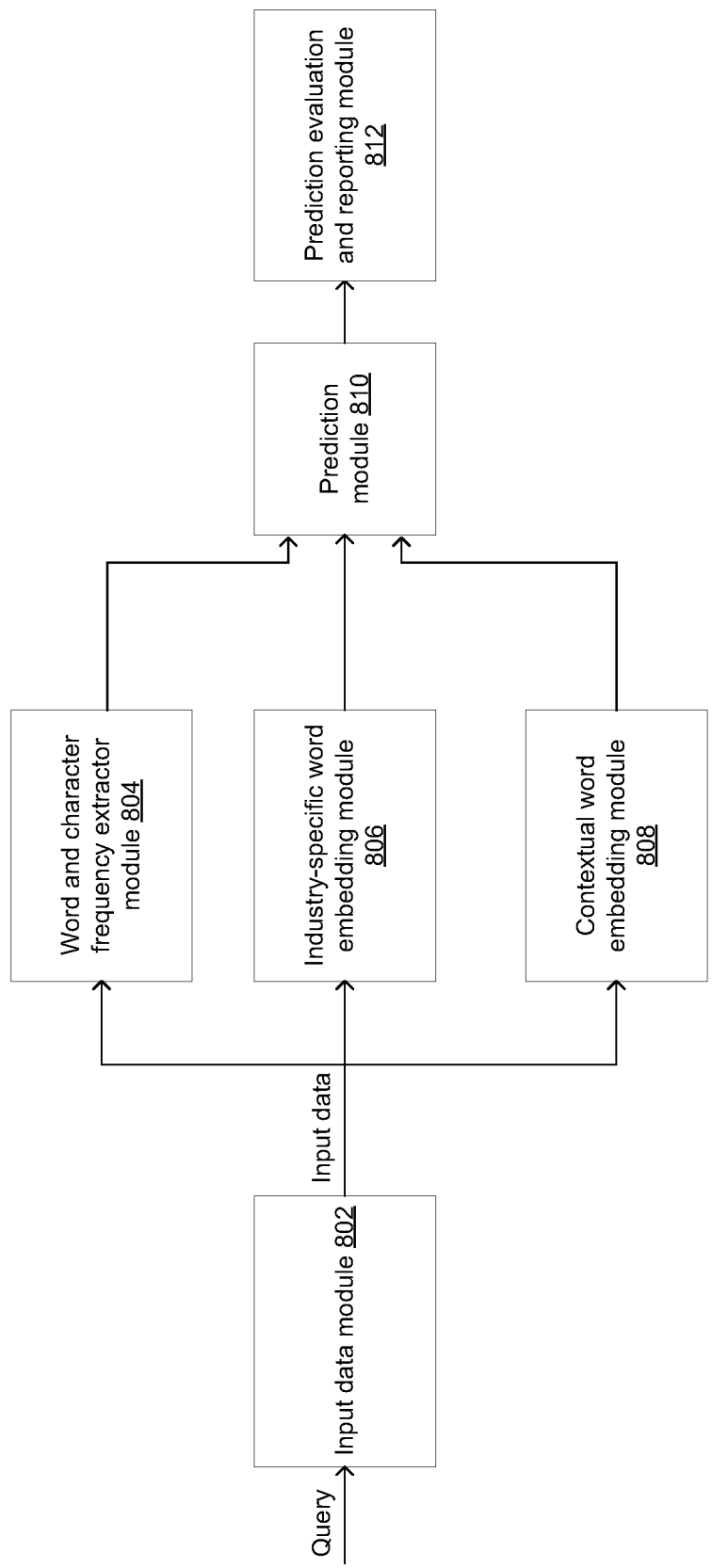
FIG. 8 is an example chatbot system implementing modules of the conversation summary generator system of FIG. 1, according to example embodiments.

FIG. 8 is an example chatbot system 800 implementing modules of the conversation summary generator system 100 of FIG. 1. The chatbot system 800 receives a query from a user through the input data module 802. The input data module 802 may also implement a graphical user interface enabling users to provide queries. The query may be a text typed directly into the graphical user interface of the input data module 802, or a spoken query, which is converted to text through a speech-to-text converter (not shown). The input data may be in the language the chatbot system 800 is trained with, or the input data may also be in a different language but translated through a translation module (not shown) into the language of the chatbot system 800. The input data may include a plurality of words representing the user question in the query, for example, "Has my package been shipped yet?", "When will my package arrive", etc.

The input data may not be processed directly by subsequent modules of the chatbot system 800 as words but may be converted to numerical representation in numerical representation modules, including word and character frequency extractor module 804, industry-specific word embedding module 806, and contextual word embedding module 808. Example embodiments of chatbot systems 800 may not need to have all the mentioned character frequency extractor module 804, industry-specific word embedding module 806, and contextual word embedding module 808).

The character frequency extractor module 804 receives the input data and may represent how frequently each word in the input data and each n-character sequence appear in the chatbot system's 800 training datasets. No word analysis with respect to the relationships between words can be performed in the character frequency extractor module 804. Further, the character frequency extractor module 804 can provide the prediction module 810, responsible for generating answers, with information to improve the accuracy of answers. The output of the character frequency extractor module 804 differs between chatbots as it is mainly influenced by the training datasets used by the enterprise implementing the chatbot system 800.

The industry-specific word embedding module 806 receives the input data and generates embeddings for the input data. The embeddings generated by the industry-specific word embedding module 806 are influenced by the industry of the enterprise implementing the chatbot system 800. For instance, a word's embeddings of a telecommunications industry would have different embeddings than those in the finance or transportation industries.

The contextual word embedding module 808 also receives input data and generates embeddings for the input data, but such embeddings capture the contextual meaning of words in the input data. Unlike industry-specific word embedding module 806, the contextual word embedding module 808 dynamically adjusts the word embeddings based on other words in the input data. The contextual word embedding module 808 enables the prediction module 810 to better understand the specific meaning of a word in the input data. For example, the meaning of the word "park" varies between "where can I park my car?" and "where is the closest national park?".

The prediction module 810 can receive input from the word and character frequency extractor module 804, the industry-specific word embedding module 806, and the contextual word embedding module 808, and predicts answers. The predicted answers of the chatbot system 800 differ from one chatbot system 800 to another, depending on the enterprise's industry implementing the chatbot system 800, particularly the training datasets used in training models of the chatbot system 800. The prediction module 810 also outputs confidence values for each predicted answer indicating correctness likelihood.

The predicted answers are provided to the prediction evaluation and reporting module 812, which determines which predicted answer of the predicted answers to provide to the user, if any. Example embodiments may include the prediction evaluation and reporting module 812 to include a plurality of confidence thresholds to compare with each predicted answer's confidence value. The confidence values are compared to a first threshold. If any confidence values are greater than the first threshold, the respective predicted answer with the highest confidence value is reported to the user. However, if none of the confidence values is greater than the first threshold, the prediction evaluation and reporting module 812 compares the confidence values to a second threshold. If any questions are greater than the second threshold, the prediction evaluation and reporting module 812 requests clarifications from the user. The clarification request may be reported to the user along with at least one of the predicted answers with a confidence value above the second threshold. If none of the confidence values is above the second threshold, the prediction evaluation and reporting module 812 reports to the user that the question in the query was not understood.

The chatbot system 800, for instance in the prediction evaluation and reporting module 812, can implement the conversation summary generator system 100 to generate conversation summaries for the chat. For example, the chat can be inputted to the conversation summary generator system 100 and the conversation summary is outputted. The conversation summary may be stored in memory 202 or displayed on a screen.

In the example embodiments, it should be understood that the conversation summary generator system 100 and conversation summary generator hardware 200 may be implemented in other manners. For example, other types of datasets can be received, and multiple preliminary models 116 may be generated since each fine-tuning iteration generates a preliminary model 116. Further, a plurality of units or components may be combined or integrated into another system, or some features may be ignored or not performed. For example, the conversation summary criterion module 112 may not exist.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of example embodiments may be implemented in a form of a software product. The software product is stored in a storage medium, and includes several instructions for instructing a computer device (which may be a personal computer, a server, or a network device) to perform all or some of the steps of the methods described in the example embodiments. The foregoing storage medium includes any medium that can store program code, such as a Universal Serial Bus (USB) flash drive, a removable hard disk, a read-only memory (Read-Only Memory, ROM), a random access memory (Random Access Memory, RAM), a magnetic disk, or an optical disc.

In the described methods or block diagrams, the boxes may represent events, steps, functions, processes, modules, messages, and/or state-based operations, etc. While some of the example embodiments have been described as occurring in a particular order, some of the steps or processes may be performed in a different order provided that the result of the changed order of any given step will not prevent or impair the occurrence of subsequent steps. Furthermore, some of the messages or steps described may be removed or combined in other embodiments, and some of the messages or steps described herein may be separated into a number of sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The described embodiments are considered to be illustrative and not restrictive. Example embodiments described as methods would similarly apply to systems or devices, and vice-versa.

The various example embodiments are merely examples and are in no way meant to limit the scope of example embodiments. Variations of the innovations described herein will be apparent to persons of ordinary skill in the art, such variations being within the intended scope of example embodiments. In particular, features from one or more of the example embodiments may be selected to create alternative embodiments comprising a sub-combination of features that may not be explicitly described. In addition, features from one or more of the described example embodiments may be selected and combined to create alternative example embodiments comprised of a combination of features which may not be explicitly described. Features suitable for such combinations and sub-combinations would be readily apparent to persons skilled in the art upon. The subject matter described herein intends to cover all suitable changes in technology.

What is claimed is:

1. A method, comprising:
receiving at least one training dataset, the at least one training dataset comprising data samples, each data sample comprising a text comprising text segments, the text being labelled with a conversation summary comprising any of the text segments which summarize the text, wherein the at least one training dataset includes a dataset from an industry-specific source relating to one or more companies and another dataset from a generic source;
generating, using a pre-trained model, a preliminary model by first fine-tuning the pre-trained model using the dataset from the generic source;
generating a conversation summary model that is industry-specific by second fine-tuning the preliminary model using the dataset from the industry-specific source; and
third fine-tuning the conversation summary model by training a classifier to predict the any of the text segments of the conversation summary of at least one data sample of the data samples of the at least one training dataset, the third fine-tuning comprising:
generating, using the pre-trained model and the classifier, the predicted any of the text segments,
computing a loss based on the predicted any of the text segments and the respective any of the text segments, wherein the respective any of the text segments is ground truth obtained from the at least one training dataset, and
back-propagating the loss through the classifier and the pre-trained model to adjust values of learnable parameters of the pre-trained model and second values of second learnable parameters of the classifier.

2. The method of claim 1, wherein the any of the text segments which summarize the text for at least one of the training datasets is null or zero text segments.

3. The method of claim 1, wherein the any of the text segments comprises one or more text segments.

4. The method of claim 1, wherein the pre-trained model is a transformer-based model.

5. The method of claim 4, wherein the transformer-based model is a RoBERTa model.

6. The method of claim 1, wherein the dataset from the generic source includes a majority of the data samples not from chat conversations.

7. The method of claim 1, wherein the dataset from the industry-specific source includes a majority of the data samples from chat conversations.

8. The method of claim 1, wherein the dataset from the industry-specific source includes data samples from chat conversations and data samples not from chat conversations.

9. The method of claim 1, wherein the dataset from the industry-specific source is a monologue.

10. The method of claim 1, wherein the at least one training dataset is an extractive dataset.

11. The method of claim 1, wherein the method is performed by at least one processor.

12. The method of claim 1, wherein an output of the pre-trained model is an input to the classifier.

13. The method of claim 1, wherein the conversation summary model is configured to generate the conversation summary of a chat conversation including chat conversation text segments.

14. The method of claim 13, wherein the conversation summary model is configured to generate respective scores for the chat conversation text segments of the chat conversation.

15. The method of claim 1, further comprising:
receiving a chat conversation, the chat conversation including chat conversation text segments;
generating, using the chat conversation and the conversation summary model, a score for each chat conversation text segment; and
generating a chat conversation summary for the chat conversation including any of the chat conversation text segments having the respective score which satisfies a criterion.

16. The method of claim 15, wherein the criterion is a specified number of chat conversation text segments having highest score values.

17. The method of claim 15, wherein the criterion is a specified number of text characters, words, lines, or paragraphs having highest scores values.

18. The method of claim 15, wherein the chat conversation further comprises a party that wrote a respective chat conversation text segment of the chat conversation text segments.

19. A computer program product generated by instructions stored in a non-transitory computer-readable medium which, when executed by at least one processor, cause the at least one processor to perform a method, the instructions comprising:
instructions for receiving at least one training dataset, the at least one training dataset comprising data samples, each data sample comprising a text comprising text segments, the text being labelled with a conversation summary comprising any of the text segments which summarize the text, wherein the at least one training dataset includes a dataset from an industry-specific source relating to one or more companies and another dataset from a generic source;
instructions for generating, using a pre-trained model, a preliminary model by first fine-tuning the pre-trained model using the dataset from the generic source;
instructions for generating a conversation summary model that is industry-specific by second fine-tuning the preliminary model using the dataset from the industry-specific source; and
instructions for third fine-tuning the conversation summary model by training a classifier to predict the any of the text segments of the conversation summary of at least one data sample of the data samples of the at least one training dataset, the instructions for third fine-tuning comprising:
instructions for generating, using the pre-trained model and the classifier, the predicted any of the text segments, instructions for computing a loss based on the predicted any of the text segments and the respective any of the text segments, the respective any of the text segments being ground truth obtained from the at least one training dataset, and instructions for back-propagating the loss through the classifier and the pre-trained model to adjust values of learnable parameters of the pre-trained model and second values of second learnable parameters of the classifier.

20. The computer program product of claim 19, the instructions further comprising:

instructions for receiving a chat conversation, the chat conversation including chat conversation text segments;

instructions for generating, using the chat conversation and the conversation summary model, a score for each chat conversation text segment; and instructions for generating a chat conversation summary for the chat conversation including any of the chat conversation text segments having the respective score which satisfies a criterion.

\* \* \* \* \*